United States Patent
Hamaker et al.

[15] 3,697,167
[45] Oct. 10, 1972

[54] OPTICAL PROJECTION APPARATUS

[72] Inventors: Ralph A. Hamaker, Penfield; Edwin Zucker, Rochester, both of N.Y.

[73] Assignee: Xerox Corporation, Rochester, N.Y.

[22] Filed: Nov. 14, 1969

[21] Appl. No.: 876,849

[52] U.S. Cl. ............... 355/8, 355/49, 355/66, 355/67
[51] Int. Cl. ............... G03b 27/50, G03b 27/70
[58] Field of Search............ 355/47, 49, 8, 66, 67, 65

[56] References Cited

UNITED STATES PATENTS

| | | | |
|---|---|---|---|
| 3,062,109 | 11/1962 | Mayo et al. | 355/8 |
| 2,309,960 | 2/1943 | Kershaw | 355/47 |
| 3,301,126 | 1/1967 | Osborne | 355/8 X |
| 3,438,704 | 4/1969 | Schoen | 355/8 |
| 3,062,094 | 11/1962 | Mayo | 355/47 X |
| 3,432,231 | 3/1969 | Gardner | 355/8 X |
| 3,528,738 | 9/1970 | Hodges | 355/8 X |

Primary Examiner—Samuel S. Matthews
Assistant Examiner—Michael D. Harris
Attorney—James J. Ralabate, David C. Petre and Barry Jay Kesselman

[57] ABSTRACT

Apparatus for projecting a flowing image of a stationary graphical original onto a moving image plane. The apparatus moves lamps and an optical component from a single cam and a linearly driven cam follower moving synchronously with the moving image plane. Crank arms connect from the cam follower arm to concentric shafts driving the lamps and mirror in synchronous movement with the moving image plane.

8 Claims, 6 Drawing Figures

PATENTED OCT 10 1972

INVENTORS
RALPH A. HAMAKER
EDWIN ZUCKER

BY Barry Jay Kesselman
ATTORNEY

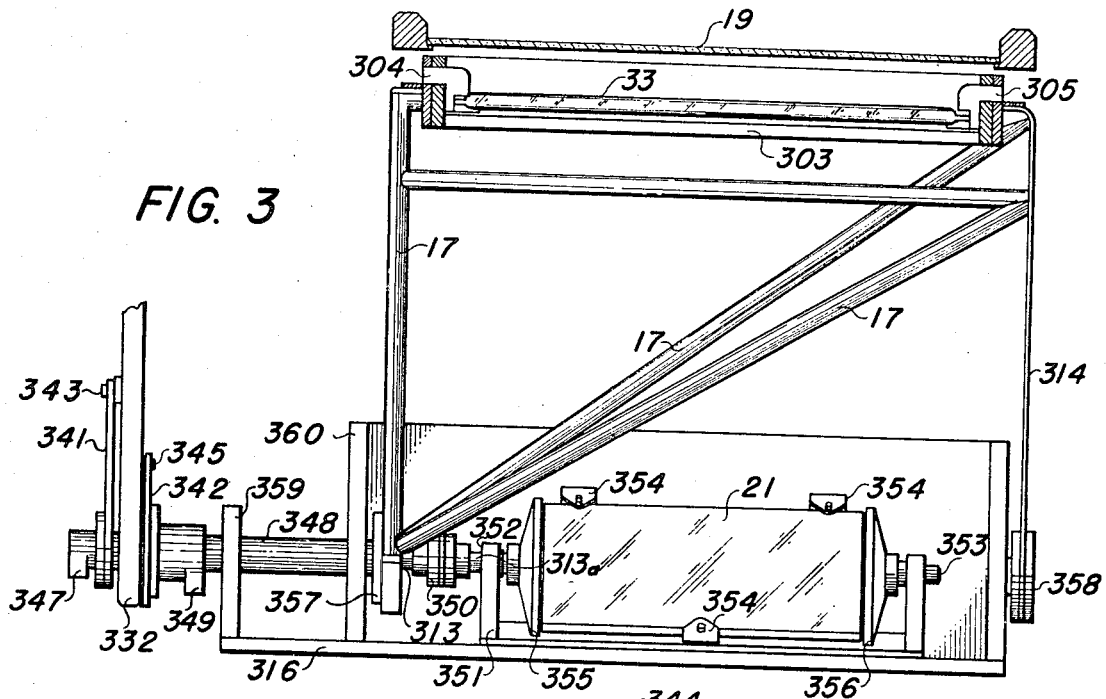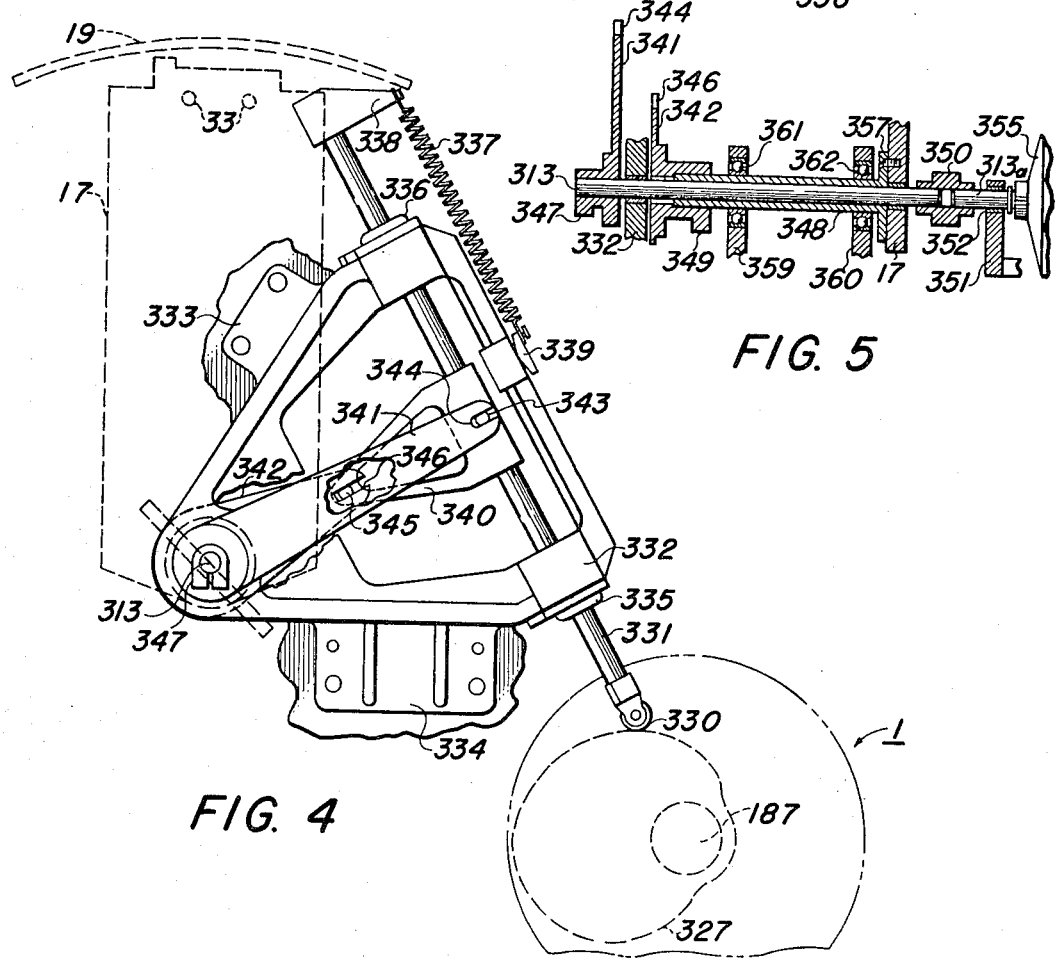

OPTICAL PROJECTION APPARATUS

This invention relates to projection apparatus and in particular to apparatus for scanning objects at a synchronous rate with a moving image plane.

Scanning devices for presenting flowing images at an image plane of a stationary object are not new. Such systems have been disclosed in U.S. Pat. Nos. 3,062,094; 3,062,095 and 3,301,126 to name a few. These prior art scanning mechanisms however, have some limitations because they are complex, bulky and not completely reliable. They generally form images having limited resolution capabilities because of the inaccuracy of the follow of the scanning elements of the projection system.

Among the prior art systems and typical of many is one where a lamp carriage supporting the illumination means moves translationally parallel to the graphic original being copied. A cooperating lens carriage moves translationally in synchronized movement with the lamp carriage. The movement of the lamp carriage and lens carriage is controlled by independent drive means using, for example, pulleys and cables slaved to the moving image plane of the optical system. The motion of the cables pulls the lamp and lens carriages along their tracks at coordinated rates of speed to achieve the successive illumination and projection of incremental portions of the graphic original for eventually forming a complete image of the original at the image plane. Because two individual systems drive the optical elements described above, two completely similar mechanisms with their increased cost and decreased system reliability are required. Another problem is that the cable drives have a tendency to stretch and change dimension further affecting the resolution capability of the mechanism in which they function. Also, the cables wear relatively quickly and may break or snap. A problem in the dynamic stability of prior art systems is that small environmental disturbances can cause vibrations which effect resolution capabilities.

The system described in U.S. Pat. No. 3,301,126 operates an oscillating mirror from a single cam with a tape drive intermediate such that the movement of the image plane and the oscillating mirror are synchronized. However, the system does not simultaneously traverse an illuminant carriage and the tape drive introduces a compliance into the scan system which may make the system vibrationally responsive to small disturbences.

Therefore, it is an object of this invention to improve scanning apparatus eliminating the problems referred to above. Another object of this invention is to improve scanning apparatus for presenting light images of stationary objects to moving image planes.

A further object of this invention is to improve the accuracy and reliability of optical scanning apparatus. Still another object of this invention is to move optical components of a scanning projection system with a single drive from a moving image plane.

Yet another object of this invention is to improve optical scanning systems by mechanical means of compact construction while still another object of this invention is to improve scanning apparatus by employing a single drive system for moving both the illuminating means and an imaging means. A further object of this invention is to move illuminating means and scan means in an arcuate path between a stationary object and moving image plane.

These and other objects of this invention are accomplished by commonly shafting a cam to a rotatably moving image plane and providing a linear motion cam follower locked within a fixed frame to drive crank arms for the moving optical components each operating from a single pivot. This functions to present a graphical original as a scanning font on the surface of the moving image plane. The font moves at the same tangential velocity as the moving image plane.

The objects and advantages of this invention will become apparent to those skilled in the art after reading the following description taken in conjunction with the accompanying drawings wherein:

FIG. 1 schematically illustrates a preferred embodiment of a machine for forming photoelectrophoretic images;

FIG. 3 is a view taken along line 3—3 of FIG. 2;

FIG. 4 is a rear view of the optical drive means system;

FIG. 5 is a sectional view of the torque tube drive of the driving mechanism of FIG. 4.

Figure 1:
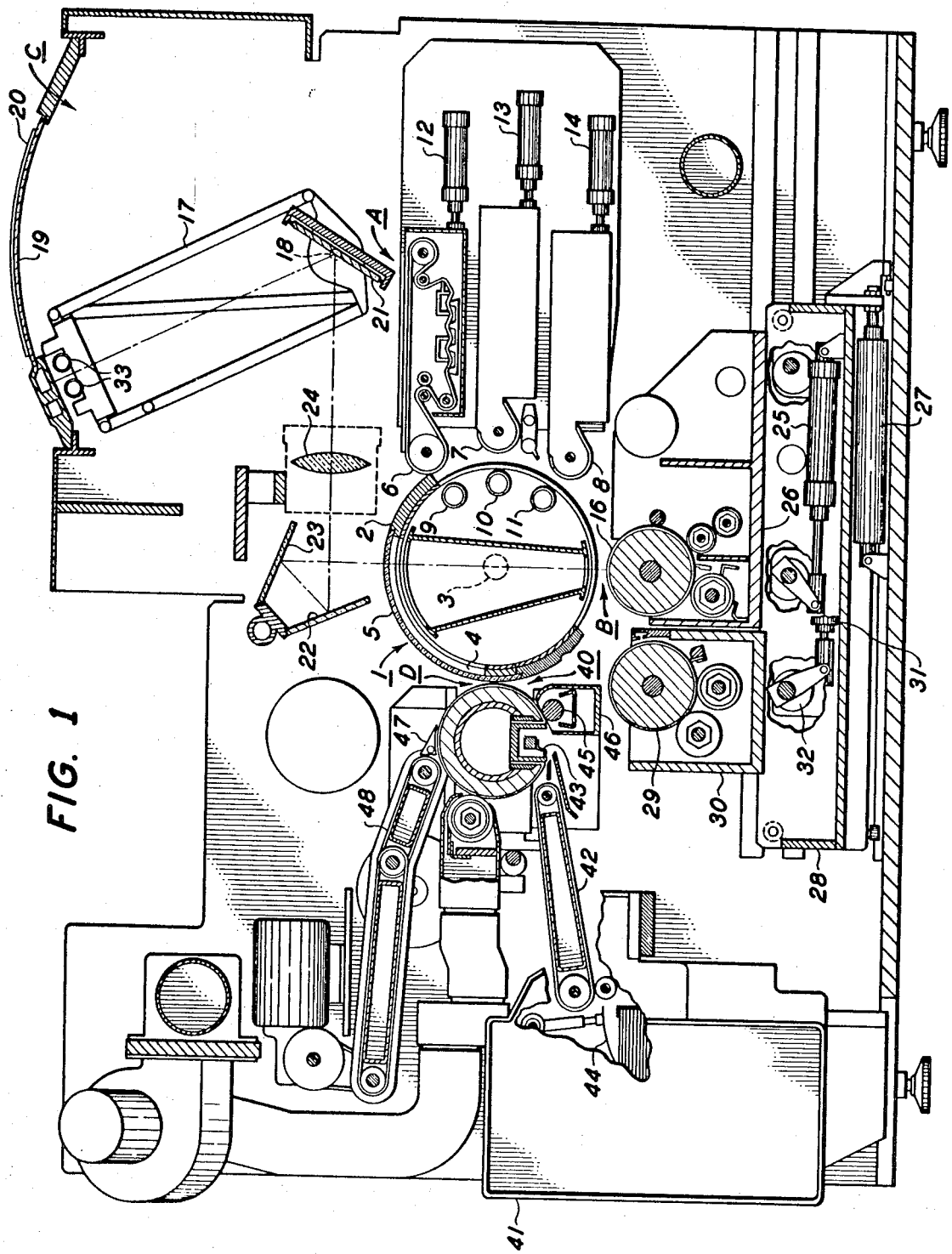

The invention shown in the succeeding figures is embodied in a machine capable of automatically making full color copies of graphic originals. The inventions used for making black and white or full color images are described in U.S. Pat. Nos. 3,384,488; 3,384,565; 3,384,566 and 3,383,993 disclosing the process of photoelectrophoretic imaging. As described in the above patents, photoelectrophoretic particles migrate in image configuration providing a visual image at one or both of two electrodes between which the particles are placed in suspension when the particles are struck by radiant energy to which they are sensitive in an electrical field environment. The particles are photosensitive and apparently undergo a net change in charge polarity or a polarity alteration by interaction with one of the electrodes upon exposure to activating electromagnetic radiation. The particles will migrate from one of the electrodes under the influence of an applied electrical field and struck with energy of a wavelength within the spectral response of the colored particles.

The invention herein is described and illustrated in a specific embodiment having specific components listed for carrying out the functions of the apparatus. Nevertheless, the invention need not be thought of as being confined to such a specific showing and should be construed broadly within the scope of the claims. Any and all equivalent structures known to those skilled in the art can be substituted for specific apparatus disclosed as long as the substituted apparatus achieves a similar function. It may be that other processes of apparatus will be invented having similar needs to those fulfilled by the apparatus described and claimed herein and it is the intention herein to describe an invention for use in apparatus other than the embodiment shown.

OPERATION OF BASIC SYSTEM

A detailed description of the operation and theories relating to the actual imaging system automated by this invention and discussing the interaction of the photoelectrophoretic particles in the suspension used for image formation is found in the above cited patents. The imaging system therein described and which can be employed in the apparatus described herein operates by producing electromagnetic radiation in image configuration to which the individual photoelectrophoretic particles within the suspension are sensitive. The activating radiation and an electric field across the imaging suspension combine between two electrodes in the imaging area. An electrode referred to as the "transparent injecting electrode" is maintained electrically positive relative to "imaging electrodes" interfacing with it at the imaging area across the photosensitive suspension. Therefore, particles within the suspension that are negatively charged will be attracted to the relatively positive, transparent injecting electrode.

The "injecting electrode" is so named because it is thought to inject electrical charges into activated photosensitive particles during imaging. The term "photosensitive" for the purposes of this invention refers to the property of a particle which, once attracted to the injecting electrode, will alter its polarity and migrate away from the electrode under the influence of an applied electric field when exposed to activating electromagnetic radiation. The term "suspension" may be defined as a system having solid particles dispersed in a solid, liquid or gas. Nevertheless, the suspension used in the embodiment of this invention described herein is of the general type having a solid suspended in a liquid carrier. The term "imaging electrode" is used to describe that electrode which interfaces with the injecting electrode through the suspension and which once contacted by activated photosensitive particles will not inject sufficient charge into them to cause them to migrate from the imaging electrode surface. The "imaging zone" or "imaging area" is that zone between two electrodes where photoelectrophoretic imaging occurs.

The particles within the suspension are generally insulating when not struck by activating radiation within their spectral response curve. The negative particles come into contact with or are closely adjacent to he injecting electrode and remain in that position under the influence of the applied electric field until they are exposed to activating electromagnetic radiation. The particles near the surface of the injecting electrode make up the potential imaging particles for the final image to be reproduced thereon. When activating radiation strikes the particles, it makes them conductive "-creating" an electrical junction of charge carriers which may be considered mobile in nature. The negative charge carriers of the electrical junction orient themselves toward the positive injecting electrode while the positive charge carriers move toward the imaging electrode. The negative charge carriers near the particle-electrode interface at the injecting electrode can move across the short distance between the particle and the surface of the electrode leaving the particle with a net positive charge. These polarity altered, net positively charged particles are now repelled away from the positive surface of the injecting electrode and are attracted to the negative surface of the imaging electrode. Accordingly, the particles struck by activating radiation of a wavelength with which they are sensitive, i.e., a wavelength which will cause the formation of an electrical junction within the particles, move away from the injecting electrode to the imaging electrode leaving behind only particles which are not exposed to sufficient electromagnetic radiation in their responsive range to undergo this change.

Consequently, if all the particles in the system are sensitive to one wavelength of light or another and the system is exposed to an image with that wavelength of light, a positive image will be formed on the surface of the injecting electrode by the subtraction of bound particles from its surface leaving behind particles in the unexposed areas only. The polarities on the system can be reversed and imaging will occur. The system may be operated with dispersions of particles which initially take on a net positive charge or a net negative charge.

The imaging suspension may contain one, two, three or more different particles of various colors having various ranges of spectral response. In a monochromatic system the particles included in the suspension may be of any color and produce any color and the particle spectral response is relatively immaterial as long as there is a response in some region of the spectrum which can be matched by a convenient radiation exposure source. In polychromatic systems the particles may be selected so that particles of different colors respond to different wavelengths For photoelectrophoretic imaging to occur, these steps (not necessarily listed in the sequence that they occur) take place: (1) migration of the particles toward the injecting electrode due to the influence of the field, (2) the generation of charge carriers within the particles when struck with activating radiation, (3) particle deposition on or near the injecting electrode surface, (4) phenomena associated with the forming of an electrical junction between the particles and the injecting electrode, (5) particle charge exchange with the injecting electrode, (6) electrophoretic migration toward the imaging electrode, and (7) particle deposition on the imaging electrode. This leaves a positive image on the injecting electrode.

After the image is formed on the injecting electrode, the electrode may be brought into interface with a transfer member which has a charge polarity opposite to that of the imaging electrode. The injecting electrode is now maintained negative relative to the transfer member. The particles having a net negative charge will be attracted to the relatively positive transfer member. If a support material is interposed between the transfer member and the particle image, the particles will be attracted to the support material. Therefore, a photographically positive image can be formed on any support material.

THE MACHINE COMPONENTS

Referring now to FIG. 1, a preferred embodiment for an automated machine to produce images according to the aforementioned process is shown. An injecting electrode 1 forms a portion of a transparent cylinder member held in a housing 2 and is journaled for rotation in direction about a shaft 3. The injecting electrode 1 is made up of a layer of optically transparent glass overcoated with a thin optically transparent layer 5 of tin oxide or other electrically conducting material. A particular material suitable for this electrode is available under the name of NESA glass manufactured by Pittsburgh Plate Glass Company, Pittsburgh, Pa. The injecting electrode 1 is formed as a portion of a cylinder housed within the metal housing frame 2.

The machine shown schematically in FIG. 1 is positioned where the injecting electrode cylinder portion is about to be rotated in a predetermined path to a cleaning station labeled A whereat a plurality of cleaning members such as belts 6, 7 and 8 contact the conductive surface 5 of the injecting electrode. On the opposite side of the injecting electrode held stationary within the machine frame are lamps 9, 10 and 11 juxtaposed to the belts 6, 7 and 8 respectively. When activated, the lamps send flood light illumination through the transparent injecting electrode at the contact areas between the electrode and the cleaning belts. Each of the belts are activated by one of the cylinders 12, 13 and 14 to contact the injecting electrode 1. These cylinders operate to press the belts against the conductive surface of the injecting electrode in order to clean it.

The next station in the path of movement of the injecting electrode is the imaging station B. Here, on the first pass of the injecting electrode 1 through station B the first imaging member, the imaging electrode 16 interfaces with the conductive surface 5 of the injecting electrode 1.

The optical system at station C projects an image to the imaging zone between the electrodes 1 and 16 at station B. The optical system has a lamp carriage 17 and a mirror 21 each journaled to oscillate at an axis 18. A document 20 is positioned at the platen 19. The lamps are shown at the start of scan position and as the injecting electrode 1 passes through the imaging area at station B the lamps move across the platen 19 projecting an image at station B through suitable mirrors 21-23, a lens 24 and the transparent electrode 1.

The imaging electrode roller 16 moves in rolling interface relation with the conductive surface 5 of the injecting electrode 1 and functions both to supply suspension to the injecting electrode and to image that suspension between the injecting electrode surface 5 and the surface of the electrode 16.

The injecting electrode continues to rotate at a constant velocity through a complete rotation of the predetermined path. It travels without interacting with any elements located around the periphery of the path until it again reaches station B at the imaging zone. Now, however, the injecting electrode 16 has been moved out of its interfacing position by operation of a cylinder 25 which lowers the electrode 16 and the housing 26 supporting it. Further, a cylinder 27 moves a carriage 28 along a horizontal path carrying with it the housing 26 which supports the imaging electrode 16. Also moved in the carriage 28 is a second imaging member, the imaging electrode 29 within a housing 30 maintaining it. A cylinder 31 operates through an eccentric 32 to raise the housing 30 and the second imaging electrode 29 at the imaging zone at the imaging station B of the machine. The second imaging electrode 29 moves in rolling interface with the injecting electrode surface 5 as that surface passes through the imaging station B. At this time the original 20 on the platen 19 is again illuminated by the scanning lamps 33 at the optical system station C. The scan is synchronized with the movement of the injecting electrode to project a flowing image in registration with the first projection and moving at the same rate as is the surface 5 at the imaging zone.

The injecting electrode 1 then passes into the transfer station D. At station D is a transfer roller 40. A sheet of support material held in the supply tray 41 is lifted therefrom and is carried through a vacuum transport 42 to the transfer roller 40. It is gripped by a gripper mechanism 43 on the transfer roller 40 and rotated to the injecting electrode 1 passing at station D. Before the sheet 44 contacts the surface 5 of the injecting electrode 1 it is moistened with a liquid that will aid in transferring the particles of the suspension on the surface 5. The wetting is accomplished by a wetting bar 45 rotated in a pool of suitable wetting material held within a tank 46. The transfer member 40 rotates the support material 44 in rolling contact with the surface 5 of the injecting electrode 1 under the influence of a suitable electric field causing the particles forming the image on the injecting electrode to be transferred to the support material. The support material is removed from the transfer member by picker fingers 47 and a release mechanism on the grippers. Next it is carried on a vacuum transport 48 to a suitable receptacle.

OPTICAL SCANNING SYSTEM

The optical projection system which transmits light radiation from an object to the imaging position at the imaging area maintains the object on the plate 19 the upper surface of which is at the object plane of the lens 24 maintained in the lens barrel 300. A platen cover 301 maintains the document in contact with the platen 19 and prevents external light from penetrating through the machine environment. A handle 302 is attached to the platen cover 301 for opening the cover during placement of the object on the platen.

Figure 2:
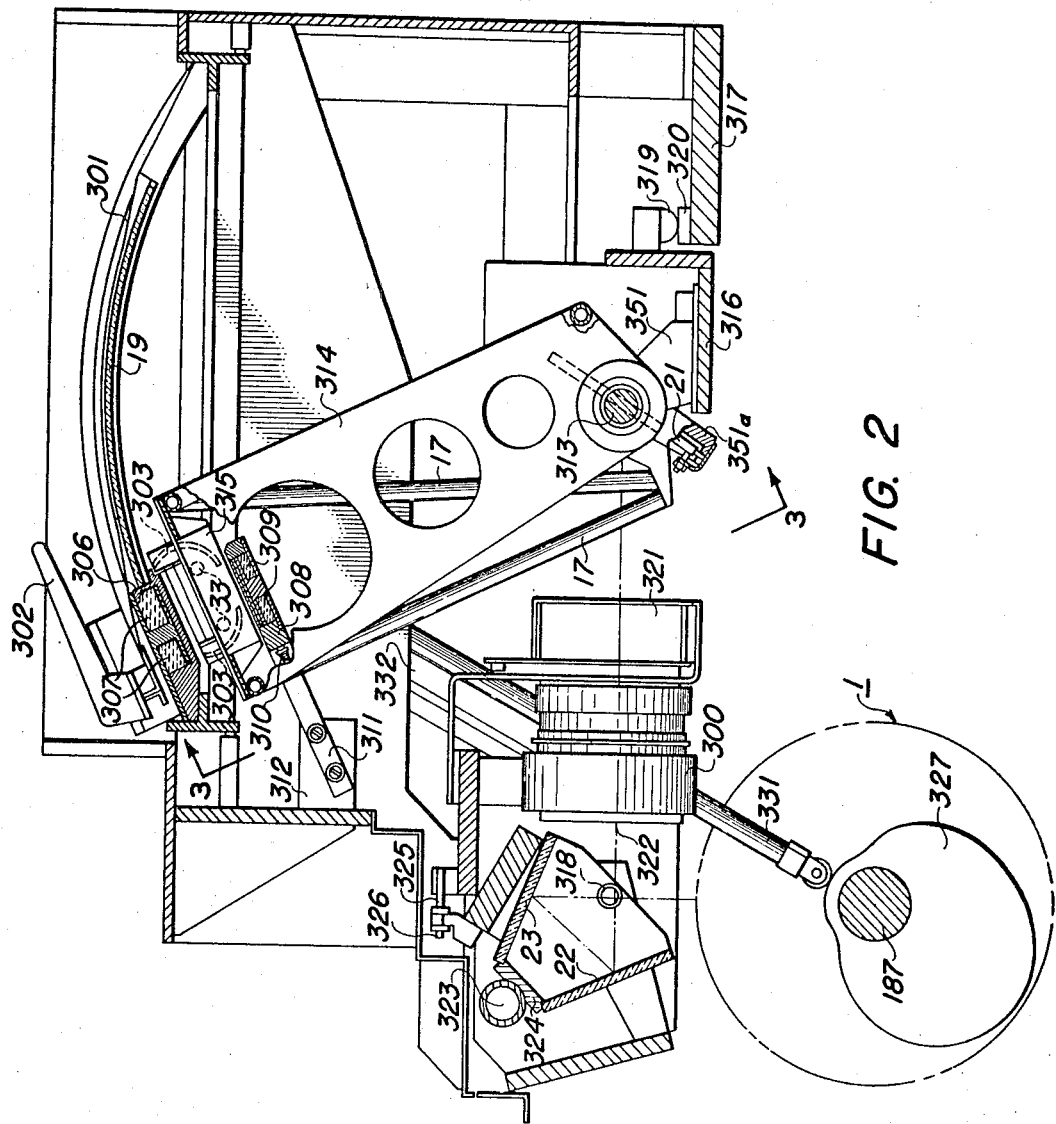
FIG. 2 is a side view of the optical scanning system and drive.
Figure 6:
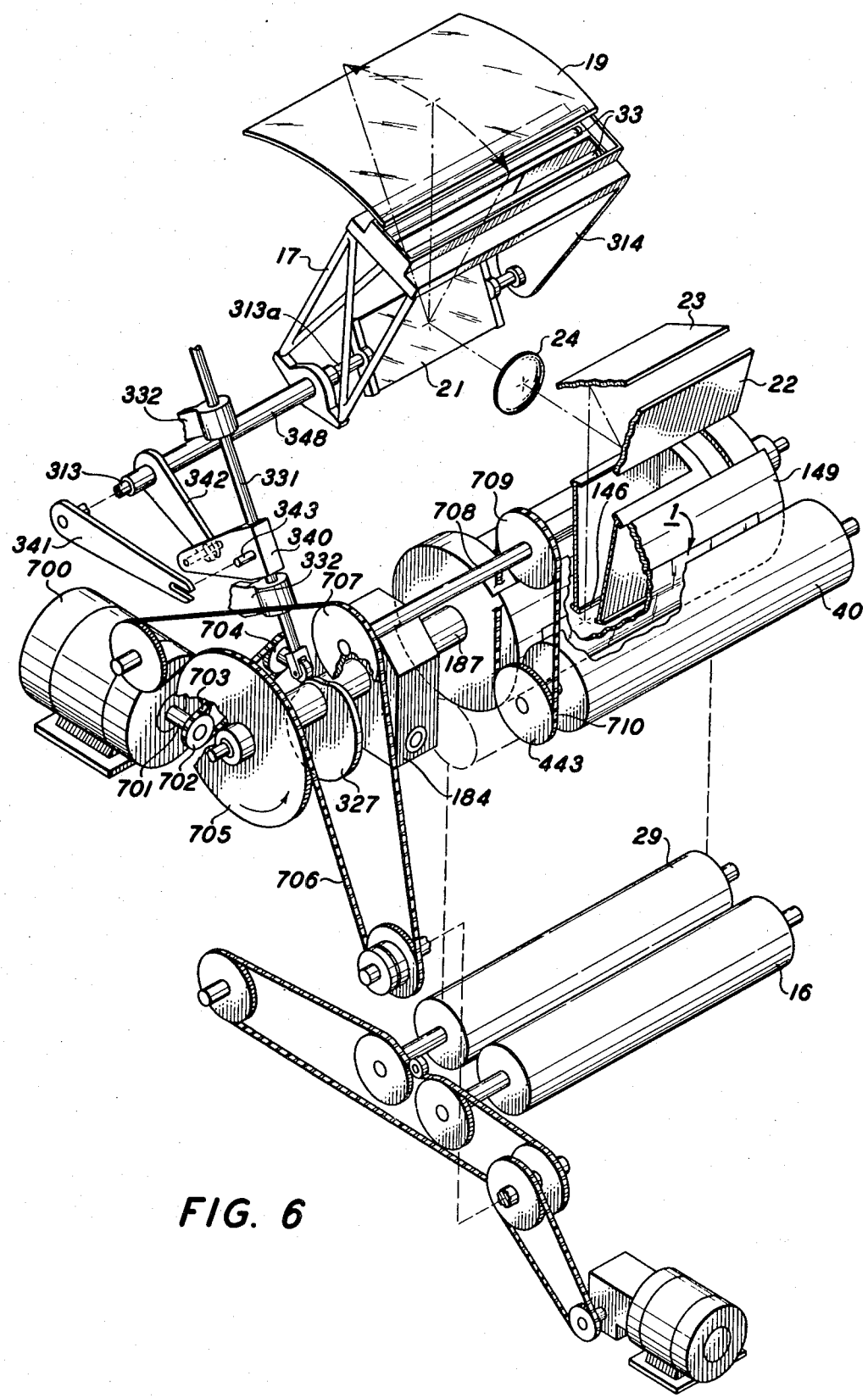
FIG. 6 is an exploded perspective schematic illustration of the drive mechanism.

The lamps 33 are held in a light reflector 303 by lamp holders 304 and 305. The lamp holders are made of a high heat resistant ceramic material necessary because of the heat output of the lamps used. The reflectors 303 are formed of hollow polished metal extrusion capable of circulating cool air, water or other fluids therethrough to control the temperature of the lamps 33. The lamps are shown in FIG. 2 in the standby position and when so positioned, they are located between an upper heat sink 306 having chambers 307 located therein and a lower heat sink 308 with chambers 309 therein. The chambers are for the circulation of cool fluid to remove heat from the area of the lamps.

For this reason an air or liquid fitting 310 is attached to the lower heat sink to permit the flow of fluids through the chambers 309. Similar fittings and fluid flow through the chambers 307 of the upper heat sink 306 are incorporated into the machine but not shown. The lower heat sink 308 is maintained on a frame 311 which is fastened to the main optical frame of the machine on a flange 312 provided for this purpose.

During projection of the object to the image zone, the lamps are rotated about an axis coincident with the mirror shaft 313 by the action of the lamp frames including a metal side frame 314 and a truss frame 17. The truss supports the main weight of the lamps while the side frame 314 ensures uniform movement of both sides of the lamp housing 315. The mirror shaft 313 causes the oscillation of the mirror 21 about the same axis. The lower optical frame 316 supports upper optical frame 317 and the platen assembly. The lower optical frame 316 is removable from the machine for maintenance and is optically set on the upper frame by a pivot 318 and a setup ball 319. The alignment positions the lower optical frame 316 relative to the center of the injecting electrode carriage housing through the use of shims 320 in the upper optical frame 317.

The scanning lamps produce light for reflection from the object. The optical path extends through the oscillating mirror 21, a shutter and optical filter box 321, the lens 24 held within the lens barrel 300 to two mirrors 22 and 23 and the inside portion of the injecting electrode 1 through the large opening in the drum frame 150. The dashed line 322 indicates the optical path. The fixed mirrors 22 and 23 are adjustable to be pivoted about a rod 323 within the frame 324 mounting the two mirrors by an adjusting screw 325 and an adjusting nut 326 revolving cooperatively on the screw thread. The nut, of course, can be locked onto the screw once the adjustment has been made and the optical path falls precisely as desired between the lens and the aperture 146 in the aperture box 145. This adjustment sets the optical center perpendicular to the drum surface and sets the overall machine conjugate.

Along the optical path is the shutter and filter box 321 which operates an automated shutter kept in an open position during the entire scan of the lamps and scanning mirror and then closed on the return stroke of the scan. This eliminates any light from penetrating the system when the lamps are returned to their standby position since the lamps are maintained lit during the return stroke. The filters within the box contain optical filtering means such as neutral density filters or the like in order to make optical corrections between the object and the imaging suspension.

As the injecting electrode drum rotates the main optical cam 327 housed on the shaft 187 drives the scanning lamps and scanning mirror. As the cam rotates with the main driving shaft 187, a cam follower 330 moves the ball spline cam follower arm 331 within the stationary frame 332. The stationary frame 332 is fastened to the machine frame via flanges 333 and 334. Within the stationary frames are ball bushings 335 and 336 which allow the cam follower arm 331 to move back and forth through the stationary flange without rotation as the cam 327 rotates with the drive shaft 187. A return spring 337 attached between a dog 338 on the cam follower arm and to a spring anchor 339 fastened to the stationary frame 332 ensures that the cam follower 330 maintains intimate contact with the cam.

Fastened onto the ball spline follower arm 331 is a driver arm 340. It is through this driver arm 340 that the mirror crank arm 341 and the lamp crank arm 342 transmit movement to the scanning mirror 21 and the lamp assembly. The driver arm 340 has one pin 343 which fits into a slot 344 in the mirror crank arm 341 and a second pin 345 for cooperative action with a slot 346 in the lamp crank arm 342. The mirror crank arm 341 is fastened to the mirror shaft 313 by a slip hub 347 tightly clamped around the shaft 313. The lamp crank arm 342 is fastened to a hollow lamp drive shaft 348 by a split hub 349 tightly clamped to the lamp drive shaft. The lamp crank arm and hub clear the mirror shaft 313 without contacting it.

As the cam follower arm 331 moves through the bushings 335 and 336 it carries with it the driver arm 340. The mirror crank arm 341 and lamp crank arm 342 are slaved to the driver arm 340 because they are slotted around the driving pins 343 and 345. This causes them to move at their slotted end according to the movement of the cam follower arm 331. This movement in turn causes the rotation of the mirror shaft 313 and hollow lamp drive shaft 348. When the mirror shaft 313 rotates it moves a shaft coupling 350 which moves the oscillating mirror frame 351a attached to the shaft extension 313a of shaft 313 by sleeve bearings 352 and 353 housed in the mirror support 351. The mirror frame 351a holds the support to the mirror 21 through clamps 354 and mirror side supports 355 and 356.

The shaft coupling 350 is in effect a low pass mechanical filter. It attenuates unwanted forces transmitted through the shaft 313 that originate because of imperfections in the cam, cam follower or ball bearings or because of general machine vibrations. The coupling may be metallic, plastic or rubber-like having a torsional spring stiffness and torsional damping properties sufficient to have the coupling act as a mechanical filter. The mechanical filter passes "noise" of a low frequency level while filtering out unwanted noise, vibrations and the like from higher frequency disturbances that are likely to occur in the machine. The particular frequencies are dependent on the torsional spring stiffness and torsional damping properties of the coupling and one should be chosen to eliminate noise known to exist in a particular machine environment in which this invention is used. The mechanical filter (coupling 350) enables the mirror to oscillate without interference from many vibrations and machine imperfections. Alternatively, to the coupling 350, the mechanical filter can be designed into one of the members such as the shaft 313 by choosing a material such as spring steel having a desirable spring stiffness.

This advantage considered with the added advantage of tying the lamp carriage commonly with the mirror cam follower provides an accurate high resolution scanning capability. The kinematic relationship of the lamp carriage to the mirror causes the lamp carriage to behave as a high inertia load on the mirror shaft. Therefore, the high inertial load of the system tends to overcome disturbances caused by imperfections and vibrations which would otherwise adversely affect the mirror motion.

The lamp crank arm 342 moving with the driver arm 340 drives the lamps across the platen. The lamp drive shaft moves the lamps through a flange 357 which mounts to the lamp frame 17. The side frame 314 holding the lamps is mounted through 358 to the main frame of the machine 316. The main frame also extends across the lamp shaft supporting it by main frame extensions 359 and 360 through bearings 361 and 362 respectively.

The driving system utilizes the cam profile and follower arm motion to drive the scanning mirror 21 at a uniform angular velocity. The system allows the object to be represented as a scanning font on the surface of the injecting electrode drum such that the font has the same tangential velocity as the injecting electrode surface at the imaging position near the aperture slot 146.

DRIVE MECHANISM

The major components of the preferred embodiment of this machine are driven in a timed synchronous movement. The components driven from the main drive system include the imaging electrodes at station B, the optical system of station C, the transfer roller mechanism at station D and the injecting electrode cylinder housing.

The main power source is the drive motor 700 which drives the motor shaft 701 thereby rotating the driving sprocket 702 with a drive chain 703 wrapped therearound. The chain 703 connects to the sprocket 704 which drives the worm 185 housed within the gear box 184. The worm drives a sprocket which is mated with the machine drive shaft 187 for turning the injecting electrode cylinder housing.

Also mated to the shaft 187 is the optical driving cam 327. The rotation of the shaft 187 rotates the cam 327 causing the cam follower arm 331 to reciprocate within the stationary frame 332. Fastened securely to the follower arm 331 is the driver arm 340 pinned to develop the timed movement of the lamps 33 and the scan mirror 21 with the injecting electrode 1.

This movement is accomplished by connecting slots within mirror crank arm 341 and the lamp crank arm 342 to pins in the driver arm 340. The pin locations and arm lengths are related in such a manner that when the follower arm 331 moves through the fixed frame 332 the lamps and mirror traverse the platen 19 timed relative to each other and to the injecting electrode 1. The timing enables optical projection of a flowing illuminated image of the object at the platen 19 through the slit 146 at the imaging zone between the injecting electrode and the imaging electrode contacting it. The mirror crank arm 341 rotates the mirror shaft 313 while the lamp crank arm 342 rotates the lamp shaft 348.

The cam 327 is generated to give the oscillating mirror 21 the required angular velocity during scan via the linearally moving ball spline 331 in order to present a flowing image of the graphical drum 1. The linear motion of the cam follower arm 331 and the driver arm 340 (the driver means) is converted to angular motion of the mirror 21 by the mirror crank arm 341 engagement with the pin 343 on the driver arm 340 through the slot 344 on the mirror crank arm. Of course, the apparatus can be made to function in the same manner if the pin is placed on the mirror crank arm and the slot on the driver arm. The cam profile is generated so that the flowing image font velocity is equal to the image member velocity.

The lamp assembly is rotated about the mirror center through the lamp crank arm 342 and the lamp shaft 348. The driver arm 340 drives the lamp crank arm 342 through the pin and slots 345 and 346. The lamp drive pin 345 is spaced relative to the mirror drive pin 343 such that the ratio of the pin locations from the axis of rotation of the drive levers minimizes the error between the scan font centerline and the lamp assembly centerline.

It has been determined, from a machine design point of view to fix the scanning velocity of the mirror 21 to set the flowing image font at a matched velocity to the image member at the image zone. The lamps 33 must be moved at a related velocity to the mirror to present the greatest illumination at the imaging zone. The levers, pins and slots are designed to minimize scanning errors in accordance with the following mathematical relationships.

Case 1
(Slots in crank arm and pins in cam follower)

$$D_m = \frac{V_t}{R} = \frac{V \cos d_m}{R}; \quad R = \frac{H}{\cos d_m} \therefore D_m = \frac{V \cos^2 d_m}{H}$$

where:
$d_m$ = mirror crank arm 341 angular position
$D_m$ = mirror crank arm 341 angular velocity
$V_t$ = tangential velocity component of the mirror pin 343
$R$ = radius (variable) from the mirror crank arm 341 pivot to the mirror pin 343
$H$ = distance from the pin 343 in the cam follower, normal to the cam follower 331, to the mirror crank arm pivot 313
and $V$ = linear velocity of the cam follower 340.
Similarly, $$D_1 = V \cos^2 d_1 / h$$

where:
$D_1$ = lamp crank arm 342 angular position
$d_1$ = lamp crank arm 342 angular velocity
and $h$ = distance, from the lamp pin 345, normal to the cam follower 331, to the pivot 348.

Since the cam 327 is designed to make $D_m$ constant during the imaging process, the angular velocity of the central optical ray reflected from the mirror will be $2D_m$;
Therefore $$D_m = K = V_o / 2R_m$$

where $V_o$ = virtual object velocity
and $R_m$ = is the radius from the mirror 21 to the object platen 19.

The cam is shaped such that, during imaging the motion is $$D_m = V \cos^2 d_m / H = V_o / 2R_m = K$$

or $$V = \frac{V_o H}{2 R_m \cos^2 d_m}$$

The lamp driving means are connected such that $$D_1 = \frac{V \cos^2 d_1}{h} = \frac{V_o H \cos^2 d_1}{2 h R_m \cos^2 d_m} = D_m \frac{H \cos^2 d_1}{h \cos^2 d_m}$$

For the optical system herein the position of the scan font centerline will coincide with the lamp assembly centerline if the angular motion of the lamp lever $D_1$ equals twice that of the mirror lever $D_m$. Since the cam profile is generated to give the mirror lever constant angular velocity, the above is satisfied at only particular positions. The amount of lag or lead $L$ at other positions will depend on the selection of the pin location ratio $H/h$.

$d_m = \arc\tan X/h$
$d_1 = \arc\tan \chi/h$ where $\chi$ is the linear distance traveled by the cam follower 340
Therefore
$\tan d_1 = H/h \tan d_m$
and $d_1 = \arc\tan [H/h \tan d_m]$
Lag or Lead $= L = 2d_m - d_1 = 2d_m - \arc\tan [K_1 \tan d_m]$
where $K_1 =$ pin location ratio $H/h$ It is preferable that the absolute value of $L$ be minimized within the total range of $d_m$.

Case 2

(Slots in cam follower and pins in crank arms)

With the cam 327 designed to make $D_m$ a constant during the imaging scan, as in Case 1, it can be mathematically shown that the cam is to give $$V = V_o R \cos d_m / 2R_m, \text{ and}$$

$$D_1 = \frac{V}{r \cos d_1} = \frac{V_o R \cos d_m}{2rR_m \cos d_1} = D_m \frac{R \cos d_m}{r \cos d_1}$$

where $r =$ radius from the lamp crank arm 342 pivot to the lamp pin 345 (Note that R and r are constant in case 2.)

A positional analysis of case 2 similar to that shown for case 1 shows $d_1 = \arc\sin [K_2 \sin d_m]$; and
$L = 2d_m - \arc\sin [K_2 \sin d_m]$
where $K_2 = R/r$ The error minimization for case 1 or case 2 enables a reduction in the illumination width at the object providing a higher flux density of light at the object platen surface.

While this invention has been described with reference to the structures disclosed herein and while certain theories have been expressed to explain the experimentally obtainable results obtained, it is not confined to the details set forth; and this application is intended to cover such modifications or changes as may come within the purposes of the improvements or the scope of the following claims.

What is claimed is:

1. In an optical scanning apparatus having optical components including at least illumination means and projection means, the improvement for scanning a graphical original in successive increments to project a flowing continuous image of the same on a moving imaging member at the image plane comprising
   drive means for moving the imaging member;
   means to move the illumination means past the graphical original;
   means to move another optical component in a predetermined motion relative to the movement of the illumination means and the imaging member;
   linearly moving means responsive to the movement of the imaging member for activating said means to move the illumination means and the other optical component; wherein,
   said drive means rotates said imaging member and said means responsive to the movement of the imaging member includes
   cam means concentrically shafted with the rotating imaging member;
   driver means responsive to the cam surface; and
   a frame supportingly confining said driver means for linear movement.

2. The apparatus of claim 1 wherein said means to move said other moving optical component means includes
   a shaft for rotating said other optical component means;
   a crank arm mounted for rotation about said shaft;
   connecting means between said shaft and said other optical component means, whereby the crank arm rotates said shaft thereby moving said other moving optical component means.

3. The apparatus of claim 2 including
   coupling means between said driver means and said crank arm mating such that the linear motion of said driver means rotates said crank arm.

4. The apparatus of claim 1 including
   first retainer means on the end of said driver means opposite the end responsive to the cam surface;
   second retainer means on the frame supporting the driver means; and
   a return spring fastened between said first and second retainer means to maintain the driver means on the cam means during rotation of the cam means.

5. The apparatus of claim 1 wherein said means to move the illumination means includes
   an illumination means shaft;
   an illumination means crank arm mounted for rotation about said shaft;
   connecting means between said shaft and the illumination means, whereby the crank arm rotates said shaft thereby moving the illumination means via the connecting means.

6. The apparatus of claim 5 including
   coupling means between said driver means and said crank arm mating such that the linear motion of said driver means rotates said crank arm.

7. The apparatus of claim 5 wherein said connecting means includes rigid frame means supporting the illumination means and being mounted to said illumination means shaft for rotation therewith.

8. The apparatus of claim 1 further including
   a first crank arm;
   a first shaft intimately attached to said first crank arm and journaled for rotation about its axis;
   first coupling means for engaging said first crank arm with said driver means said first crank arm being engaged at the end opposite the shaft attached end;
   means fixedly connecting said first shaft with the illumination means;
   second coupling means on said driver means;
   a second shaft concentric with and independently rotatable from said shaft, said second shaft rotatable about its axis;
   a second crank arm mated with said second shaft at one end said arm and engaged with said second coupling means at the other end thereof, whereby the driver means through the second crank arm rotates said second shaft about its axis as said driver means moves; and
   means fixedly connecting said second shaft with said other moving optical component.

* * * * *